US008661506B2

(12) United States Patent
Nakashima

(10) Patent No.: US 8,661,506 B2
(45) Date of Patent: Feb. 25, 2014

(54) INFORMATION PROCESSING SYSTEM, INFORMATION PROCESSING APPARATUS AND INFORMATION PROCESSING METHOD

(75) Inventor: Kousuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 12/613,427

(22) Filed: Nov. 5, 2009

(65) Prior Publication Data

US 2010/0122319 A1 May 13, 2010

(30) Foreign Application Priority Data

Nov. 7, 2008 (JP) ................................. 2008-286723

(51) Int. Cl.
G06F 17/30 (2006.01)
(52) U.S. Cl.
USPC ............................................................ 726/2
(58) Field of Classification Search
None
See application file for complete search history.

(56) References Cited

U.S. PATENT DOCUMENTS

2003/0011633 A1 1/2003 Conley et al.
2005/0188226 A1* 8/2005 Kasatani ....................... 713/201
2006/0077423 A1 4/2006 Mathieson et al.
2006/0274367 A1* 12/2006 Yamamoto et al. .......... 358/1.15

FOREIGN PATENT DOCUMENTS

| EP | 1533988 A1 | 5/2005 |
| EP | 1843568 A1 | 10/2007 |
| JP | 2005-324450 A | 11/2005 |
| JP | 2006-127503 A | 5/2006 |
| JP | 2006-134301 A | 5/2006 |
| JP | 2007-300334 A | 11/2007 |

* cited by examiner

*Primary Examiner* — Brandon Hoffman
(74) *Attorney, Agent, or Firm* — Canon USA, Inc. IP Division

(57) ABSTRACT

A system includes a web server and an apparatus with a web browser configured to display an operation screen provided by the web server. The apparatus authenticates a user and transmits authentication information to the web server when the user is authenticated and requests the operation screen which is to be displayed on the web browser. The web server determines whether the authentication information has been received from the apparatus when the operation screen is requested and transmits the operation screen to the apparatus when it is determined that the authentication information has been received from the information processing apparatus as a result of the determination.

18 Claims, 15 Drawing Sheets

FIG.13

| http://abcde.fgh.co.jp/ |
| http://abcde.abc.co.jp/ |
| http://123.456.789.co.jp/ |

INFORMATION PROCESSING SYSTEM, INFORMATION PROCESSING APPARATUS AND INFORMATION PROCESSING METHOD

BACKGROUND OF THE INVENTION

1. Field of the Invention

The present invention relates to a web server and an apparatus with a web browser for displaying an operation screen provided by the web server.

2. Description of the Related Art

An information processing apparatus such as a personal computer (PC) can be connected to a web server on a network and an operation screen provided by the web server is displayed on a web browser of the information processing apparatus.

In this case, the web browser of the information processing apparatus requests the operation screen from the web server. A web application on the web server responds to the request from the information processing apparatus and sends a HTML file for displaying the operation screen on the web browser to the information processing apparatus. The web browser of the information processing apparatus analyzes the received HTML file to display the operation screen based on the description of the received HTML file.

When a user inputs instructions through the operation screen displayed on the web browser, the web browser notifies the web server of the input instructions. The web application on the web server which has received the notification executes a process in accordance with the input instructions.

Recently, some multi-function peripherals (MFP) with a scanner or a printer have also been equipped with the above-mentioned web browser. The MFP displays the operation screen provided by the web server using the foregoing steps on the web browser of the MFP and receives various instructions from the user.

There has been also a technique discussed in Japanese Patent Application Laid-Open No. 2006-127503. According to Japanese Patent Application Laid-Open No. 2006-127503, the web server provides an operation screen on which instructions for using various functions of the MFP are input. In other words, the user of the MFP inputs instructions to be issued to the MFP through the operation screen displayed on the web browser. The web browser of the MFP notifies the web server of the input instructions.

The web server receiving the notification requests the MFP to execute various processes according to the contents of the instructions input by the user. The MFP receiving the request executes the requested processes. This eliminates the need for storing all the menu data for operating the MFP in the MFP and enables the user to readily revise the menu data on the web server.

Some information processing apparatus such as the foregoing PC and MFP are provided with a function to authenticate a user who operates the information processing apparatus and permit the user to use the information processing apparatus according to an authentication result. When the user uses the information processing apparatus provided with such a function, the user first is to input his or her own authentication information (user ID, for example). The input authentication information is checked with the information previously registered in the information processing apparatus and the user is permitted to use the information processing apparatus based on the check result.

Some web servers described above have a function to authenticate a user who can use a web application in the web server. When the operation screen is requested by the web browser of the information processing apparatus, such a web application transmits first to the information processing apparatus the screen information for displaying on the web browser an authentication screen, which causes the user to input the authentication information. The web application executes an authentication process based on the authentication information input through the authentication screen displayed on the web browser and the user is permitted to use the web application according to the authentication result.

However, when the web application with such an authentication function is accessed through the web browser of the information processing apparatus with the aforementioned authentication function, user-friendliness may decrease.

More specifically, the user is to input not only the authentication information used for the authentication process to be executed by the information processing apparatus, but also the authentication information used for the authentication process to be executed by the web application. In other words, when the web application with the authentication function is operated by the information processing apparatus with the authentication function, the authentication information is to be input more than once, which is not user friendly.

SUMMARY OF THE INVENTION

According to an aspect of the present invention, a system includes a web server and an apparatus with a web browser configured to display an operation screen provided by the web server, wherein the apparatus includes: an authentication unit configured to authenticate a user; and a requesting unit configured to transmit authentication information to the web server when the user is authenticated and request the operation screen which is to be displayed on the web browser; and wherein the web server includes: a determination unit configured to determine whether the authentication information has been received when the operation screen is requested from the information processing apparatus; and a transmission unit configured to transmit the operation screen to the apparatus when the determination unit determines that the authentication information has been received from the apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a chart illustrating the user ID transmission list according to the exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention is described below. In the first exemplary embodiment, an MFP is described as an example of the information processing apparatus of the exemplary embodiment of the present invention. The MFP performs an authentication process for authenticating a user. Then, the MFP transmits the user ID to be used for the authentication process to a web server to request an operation screen, which is to be displayed on a web browser of the MFP. A web application on the web server determines whether the user ID is received from the MFP. If the user ID is received, the web application transmits the operation screen to the MFP.

Figure 1:
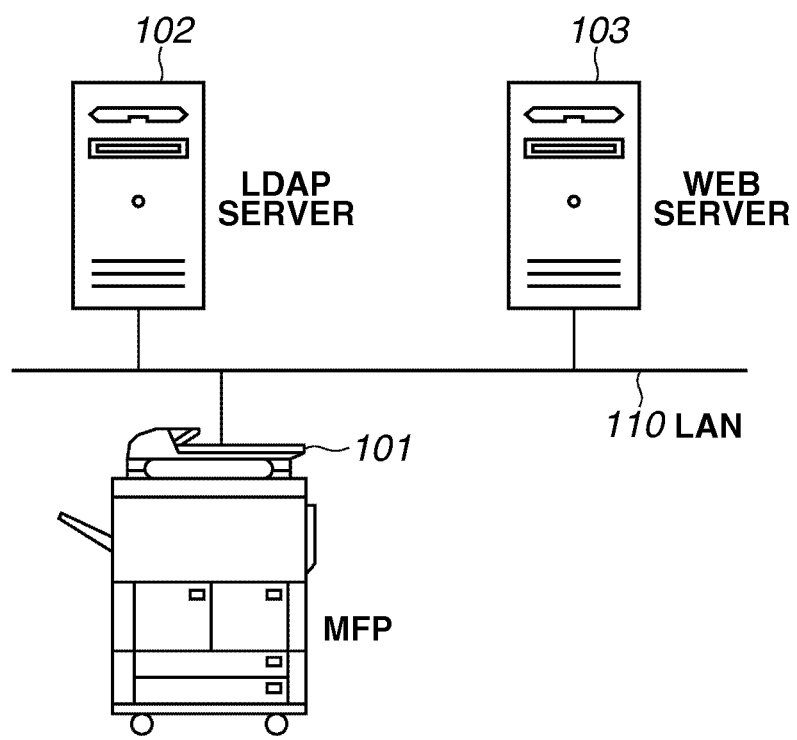
FIG. 1 is a general block diagram illustrating an information processing system according to the exemplary embodiment of the present invention.

FIG. 1 is a general block diagram illustrating an information processing system according to the first exemplary embodiment. An MFP 101, a lightweight directory access protocol (LDAP) server 102, and a web server 103 are connected to a LAN 110 to communicate with each other. A file transfer protocol (FTP) server (not shown) is provided on the LAN 110 to enable FTP-transmission of image data from the MFP 101 to the FTP server.

Figure 2:
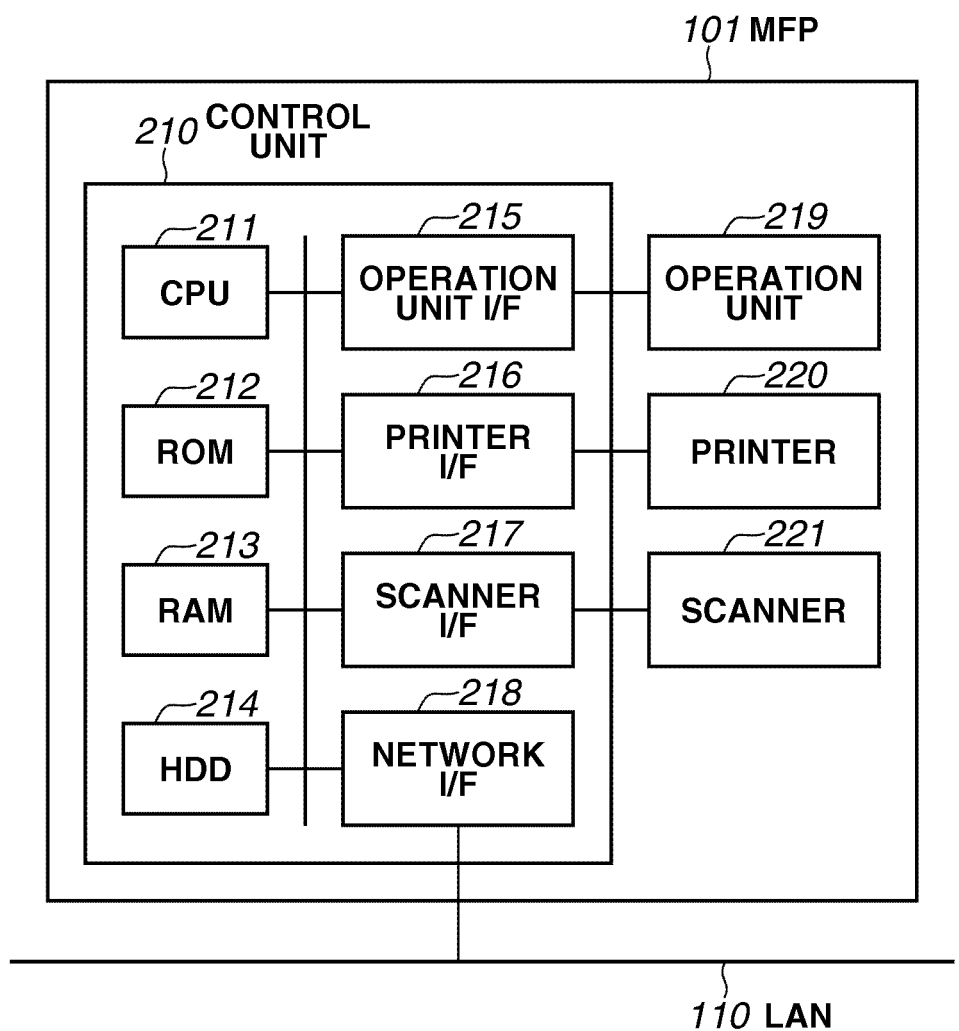
FIG. 2 is a block diagram illustrating the configuration of an MFP according to the exemplary embodiment of the present invention.

FIG. 2 is a block diagram illustrating the configuration of the MFP 101.

A control unit 210 including a CPU 211 controls the operation of the entire MFP 101. The CPU 211 reads the control program stored in a ROM 212 to execute various control processes such as reading control and transmission control. A RAM 213 is used as a temporary storage area such as a main memory and a work area of the CPU 211. A HDD 214 stores image data, various programs, or various information tables described below.

An operation unit I/F 215 connects an operation unit 219 with the control unit 210. The operation unit 219 includes a liquid crystal display unit with a touch panel function and a key board (not shown). The MFP 101 has a web browser function described below. The web browser of the MFP 101 analyses a HTML file received from the web server 103 and displays the operation screen based on the description of the received HTML file on the operation unit 219.

A printer I/F 216 connects a printer 220 with the control unit 210. Image data to be printed by the printer 220 is transferred from the control unit 210 to the printer 220 through the printer I/F 216 and printed on a storage medium by the printer 220.

A scanner I/F 217 connects a scanner 221 with the control unit 210. The scanner 221 reads an image on a document to form image data and inputs the image data to the control unit 210 through the scanner I/F 217.

A network I/F 218 connects the control unit 210 (the MFP 101) with a LAN 110. The network I/F 218 transmits image data or information to an external apparatus (such as the LDAP server or the web server 103, for example) on the LAN 110 and receives various information from the external apparatus on the LAN 110.

Figure 3:
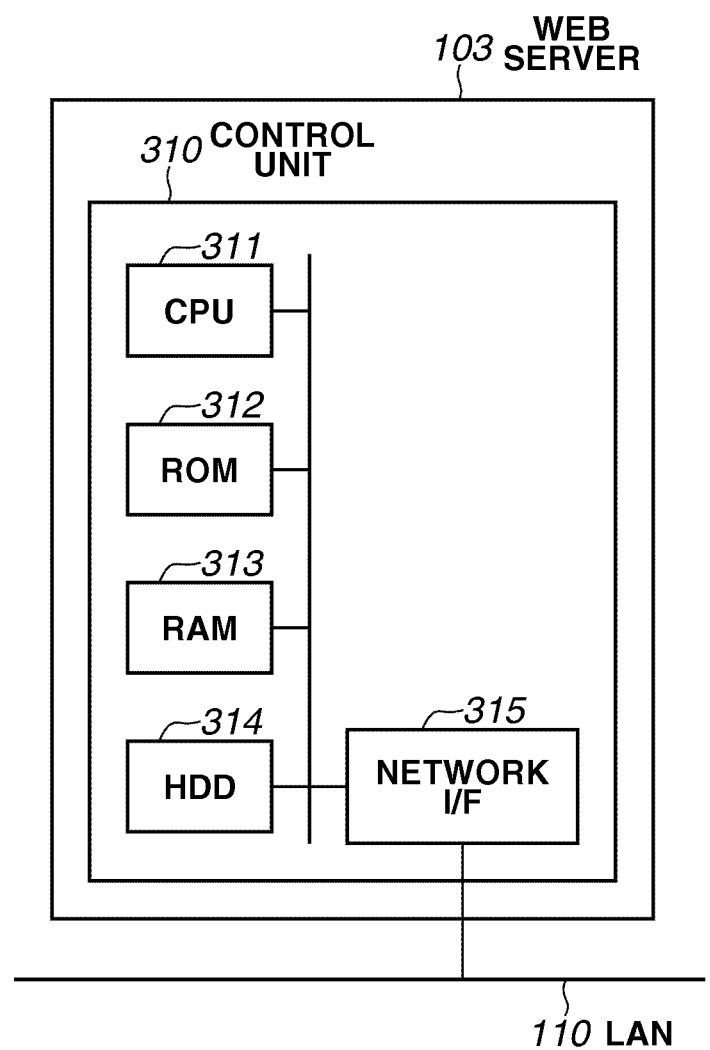
FIG. 3 is a block diagram illustrating the configuration of the web server according to the exemplary embodiment of the present invention.

FIG. 3 is a block diagram illustrating the configuration of the web server 103. The LDAP server 102 has a configuration similar to the web server 103.

A control unit 310 including a CPU 311 controls the operation of the entire web server 103. The CPU 311 reads the control program stored in a ROM 312 to execute various control processes. A RAM 313 is used as a temporary storage area such as a main memory and a work area of the CPU 311. A HDD 314 stores image data, various programs, or various information tables described below.

A network I/F 315 connects the control unit 310 (the web server 103) with the LAN 110. The network I/F 315 transfers various information to and from other apparatus on the LAN 110.

Figure 4:
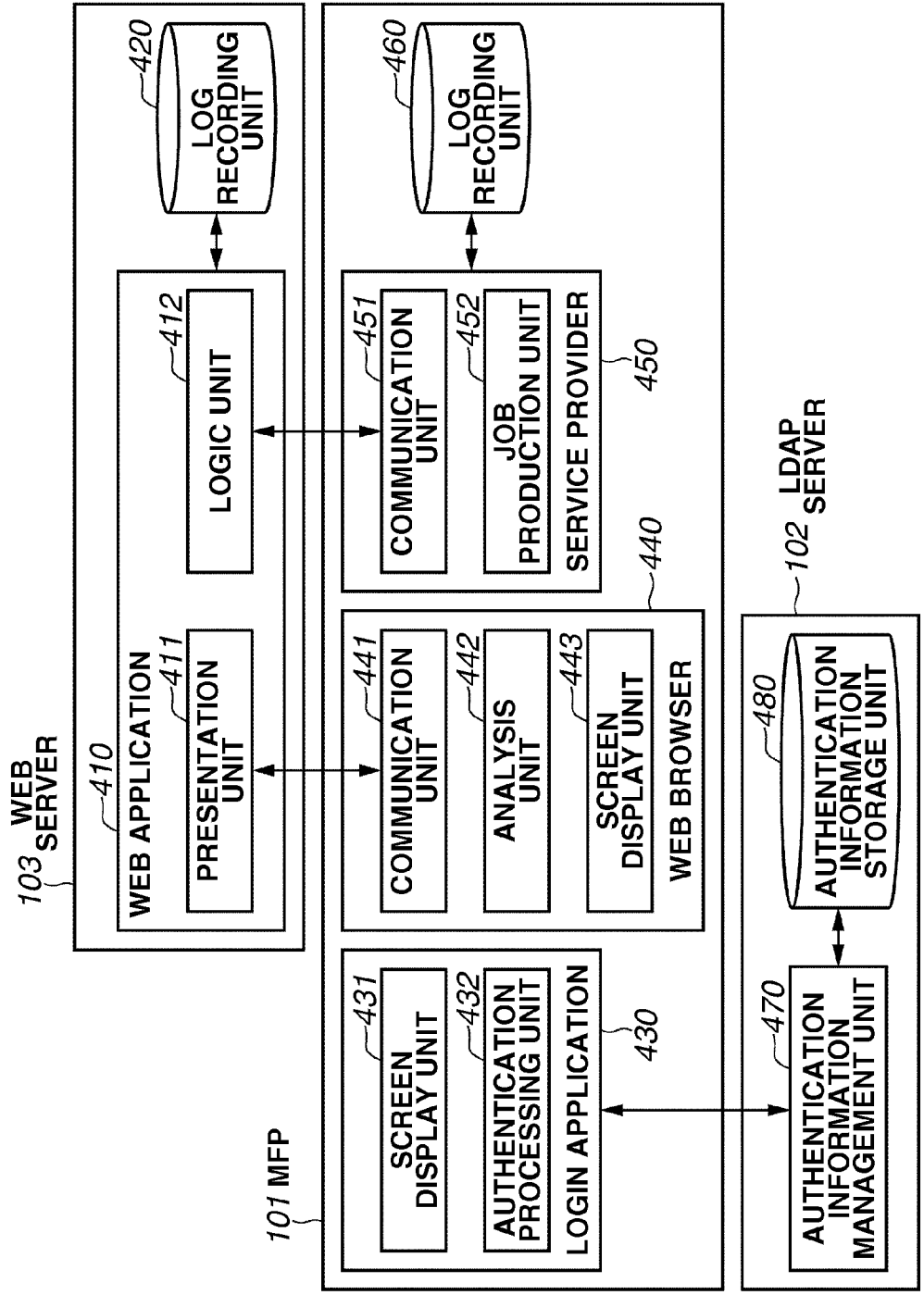
FIG. 4 is a block diagram illustrating the configuration of software for the information processing system according to the exemplary embodiment of the present invention.

FIG. 4 is a block diagram illustrating the configuration of software for the entire information processing system. The function units illustrated in FIG. 4 are realized by the CPUs provided on the MFP 101, the LDAP server 102, and the web server 103 executing the control programs.

The MFP 101 includes a login application 430, a web browser 440, a service provider 450, and a log recording unit 460.

The login application 430 includes a screen display unit 431 and an authentication process unit 432. The screen display unit 431 displays on the operation unit 219 an authentication screen for causing a user to input authentication information used for authentication process executed by the authentication process unit 432. The authentication screen is not provided by the web server 103, but the login application 430 reads information previously stored in the MFP 101 and displays the authentication screen. The screen thus displayed based on the information previously stored in the MFP 101 is referred to as a native screen.

When the authentication information is input through the authentication screen displayed by the screen display unit 431, the authentication process unit 432 performs a user authentication process using the input authentication information.

The LDAP server 102 includes an authentication information management unit 470 and an authentication information holding unit 480. The authentication information holding unit 480 (or the authentication information storage unit) previously stores authentication information corresponding to the user who is permitted to use the MFP 101. The authentication information management unit 470 manages the authentication information stored in the authentication information holding unit 480.

The authentication process unit 432 performs the authentication process by checking the authentication information input through the authentication screen displayed by the screen display unit 431 with the authentication information stored in the authentication information holding unit 480. The user is permitted to use the MFP 101 according to the check result.

The web browser 440 includes a communication unit 441, an analysis unit 442, and a screen display unit 443. The communication unit 441 communicates with a presentation unit 411 of a web application 410 in accordance with the HTTP protocol. More specifically, the communication unit 441 requests the operation screen displayed on the web browser from the web application 410 or informs the web application 410 of the user's instructions input through the operation screen displayed on the web browser.

The analysis unit 442 analyzes the HTML file received from the web application 410. The HTML file includes a description indicating the contents of the operation screen to be displayed on the web browser.

The screen display unit 443 displays the operation screen on the operation unit 219 based on the result analyzed by the analysis unit 442. The screen thus displayed based on the information (the HTML file) received from the web server 103 is referred to as a web browser screen.

The web server 103 includes the web application 410 and a log recording unit 420. The web application 410 includes the presentation unit 411 and a logic unit 412.

The presentation unit 411 communicates with the communication unit 441 to transmit the operation screen to be displayed on the web browser of the MFP 101 to the MFP 101 in response to the request from the MFP 101. The presentation unit 411 receives the user's instructions input through the operation screen displayed on the web browser of the MFP 101.

The web application 410 receiving the user's instructions executes various processes in accordance with the contents of the instructions and requests the MFP 101 to execute the processes. More specifically, the web application 410 requests the MFP 101 to execute a printing process by the printer 220, a reading process by the scanner 221, or a transmitting process through the network I/F 218 of the MFP 101.

When the web application 410 requests the MFP 101 to execute the processes, the logic unit 412 communicates with a communication unit 451 of the service provider 450 included in the MFP 101. The results of the processes executed by the MFP 101 are recorded in the log recording unit 420. The log recording unit 420 also records the results of authentication process executed by the web server 103.

The service provider 450 includes the communication unit 451 and a job generating unit 452. The communication unit 451 receives a request to perform a process from the logic unit 412 of the web application 410. When the communication unit 451 is requested to execute the process from the web application 410, the job generating unit 452 produces and executes a job for executing the requested process. The result obtained by executing the job is recorded in the log recording unit 460. The log recording unit 460 also records the results of the authentication process executed by the login application 430 and the history of communication with the web server 103.

Figure 5:
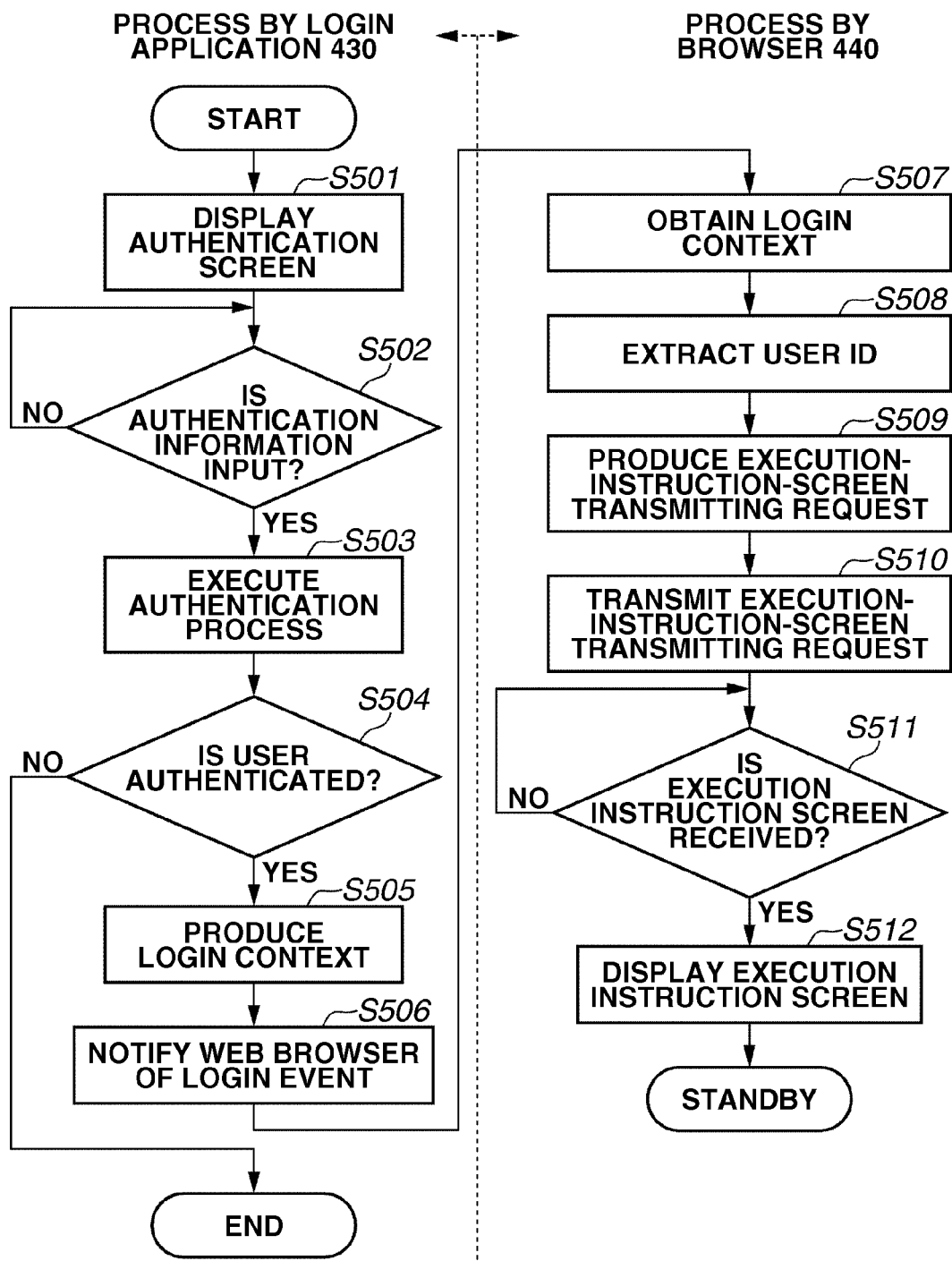
FIG. 5 is a flow chart describing the operations of the MFP according to the exemplary embodiment of the present invention.

FIG. 5 is a flow chart describing a series of operations in which the MFP 101 performs a user authenticating process and transmits the authentication information used for the authentication to the web server 103 to request the operation screen which is displayed on the web browser of the MFP 101, from the web server 103. Each operation illustrated in the flow chart in FIG. 5 is realized by the CPU 211 of the MFP 101 executing a control program. The steps S501 to S506 are processes executed by the login application 430 and the steps S507 to S512 are processes executed by the web browser 440.

Figure 6:
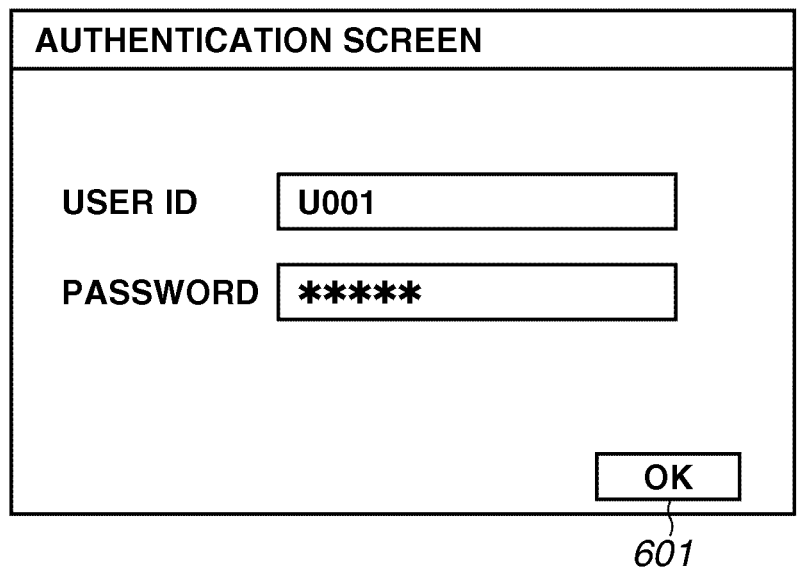
FIG. 6 is a diagram illustrating an authentication screen displayed on the operation unit of the MFP according to the exemplary embodiment of the present invention.

In step S501, the screen display unit 431 displays the authentication screen on the operation unit 219. FIG. 6 is a diagram illustrating an example of the authentication screen displayed in step S501. A user inputs a user ID and a password through the authentication screen.

In step S502, the CPU 211 determines whether the authentication information has been input by the user. More specifically, the CPU 211 determines whether an OK button 601 on the authentication screen illustrated in FIG. 6 is depressed. If the CPU 211 determines that the OK button 601 is depressed (YES in step S502), the process proceeds to step S503. If the authentication information is not input (NO in step S502), the process is on standby until the authentication information is input.

In step S503, the authentication process unit 432 performs the authentication process using the input user ID and password. The authentication process unit 432 communicates with the LDAP server 102 to check the input user ID and password with the information previously stored in the authentication information holding unit 480.

As a result of the authentication process, if the user is correctly authenticated (YES in step S504), the process proceeds to step S505. If the user is not correctly authenticated (NO in step S504), the process is ended. In step S505, a login context corresponding to the authenticated user is produced. The login context is information indicating the authenticated user and includes the user ID input through the authentication screen illustrated in FIG. 6. In step S506, the web browser 440 is notified that the user authentication has been correctly ended and the user has logged in (login event).

In step S507, the web browser 440 obtains the login context produced by the login application 430. In step S508, the user ID input by the user through the authentication screen illustrated in FIG. 6 is extracted from the obtained login context.

In step S509, a request to transmit an execution instruction screen is produced, in which the web server 103 is requested to transmit the execution instruction screen. The execution instruction screen is one of the operation screens displayed on the web browser of the MFP 101 and through the execution instruction screen, the user gives instructions to execute the process. The request to transmit an execution instruction screen includes the user ID extracted in step S508. In step S510, the produced request to transmit the execution-instruction screen is transmitted to the web server 103.

In step S511 (is execution instruction screen received?), the CPU 211 determines whether the execution instruction screen is transmitted from the web server 103 in response to the request to transmit execution instruction screen transmitted in step S510. Actually, the HTML file is transmitted from the web server 103, as a screen information for displaying the execution instruction screen on the web browser.

If the execution instruction screen is received from the web server 103 (YES in step S511), the process proceeds to step S512. If the execution instruction screen is not received (NO in step S511), the process is on standby until the execution instruction screen is received. In step S512, the execution instruction screen is displayed in accordance with a description of the received HTML file.

Figure 7:
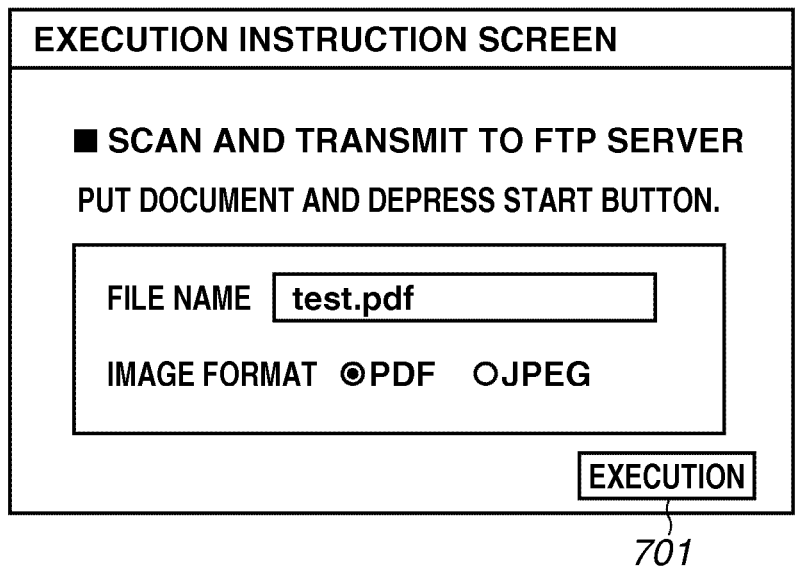
FIG. 7 is a diagram illustrating an operation screen displayed on the operation unit of the MFP according to the exemplary embodiment of the present invention.

FIG. 7 is a diagram illustrating an example of the execution instruction screen displayed in step S512. FIG. 7 illustrates an example of the screen via which instructions that an image on the document is read using the scanner 221 of the MFP 101 to produce image data and the produced image data is transmitted to the FTP server on the LAN 110, are given. In the example illustrated in FIG. 7, the image data is produced in a PDF format and a file name, "test.pdf." is given.

Figure 8:
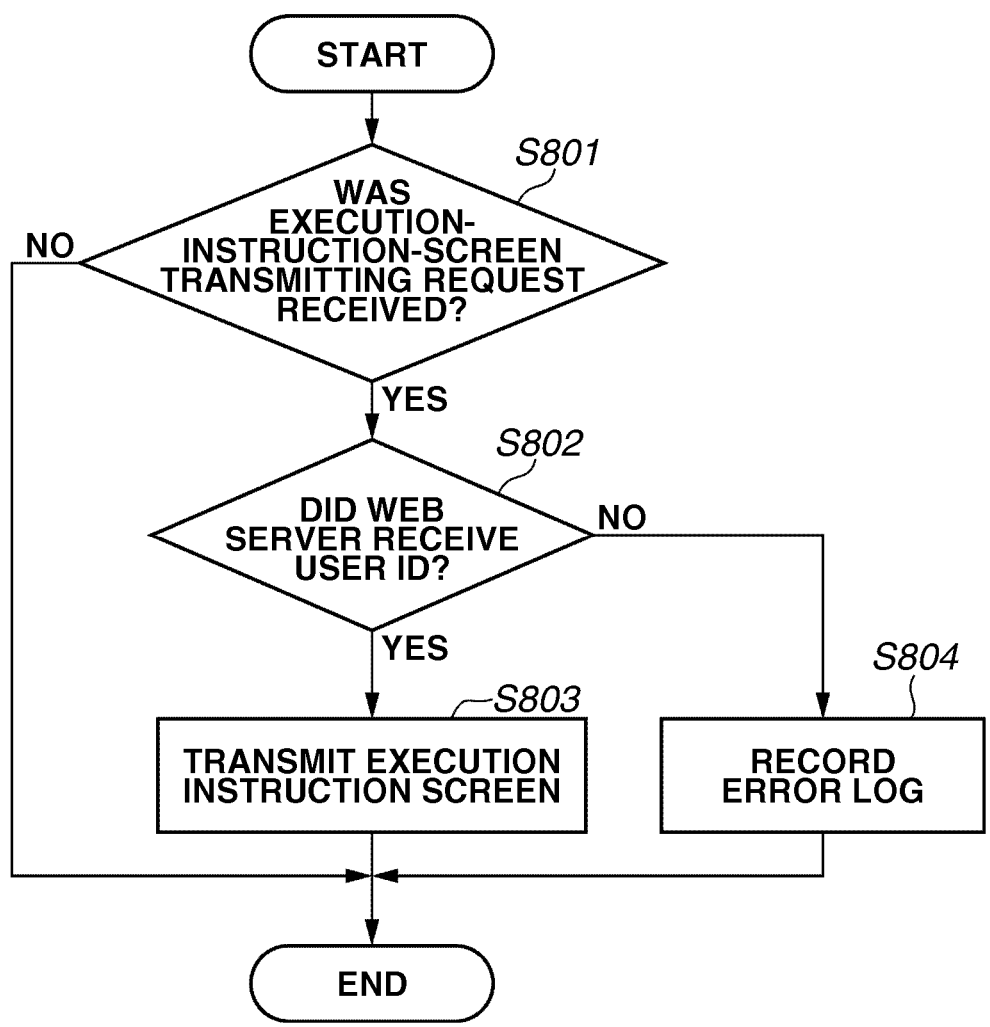
FIG. 8 is a flow chart describing the operations of the web server according to the exemplary embodiment of the present invention.

FIG. 8 is a flow chart describing a series of operations executed by the web server 103 when the MFP 101 executes the processes described in FIG. 5. Each operation illustrated in the flow chart in FIG. 8 is realized by the CPU 311 of the web server 103 executing the control program.

In step S801, the CPU 311 determines whether the web server 103 has received the request to transmit execution instruction screen from the MFP 101. If the web server 103 has received the request to transmit execution instruction screen (YES in step S801), the process proceeds to step S802. If the web server 103 has not received the request to transmit execution instruction screen (NO in step S801), the process is ended.

In step S802, the CPU 311 determines whether the web server 103 has received the user ID from the MFP 101. If the request to transmit execution instruction screen includes the user ID, the CPU 311 determines that the web server 103 receives the user ID. If the request to transmit execution instruction screen does not include the user ID, the CPU 311 determines that the web server 103 has not received the user ID.

If the web server 103 has received the user ID (YES in step S802), the process proceeds to step S803 and the web server 103 transmits the HTML file used for displaying the execution instruction screen to the MFP 101. On the other hand, if the web server 103 has not received the user ID (NO in step S802), the process proceeds to step S804 to record log information indicating the occurrence of an error in the log recording unit 420 and the process is ended.

Figure 9:
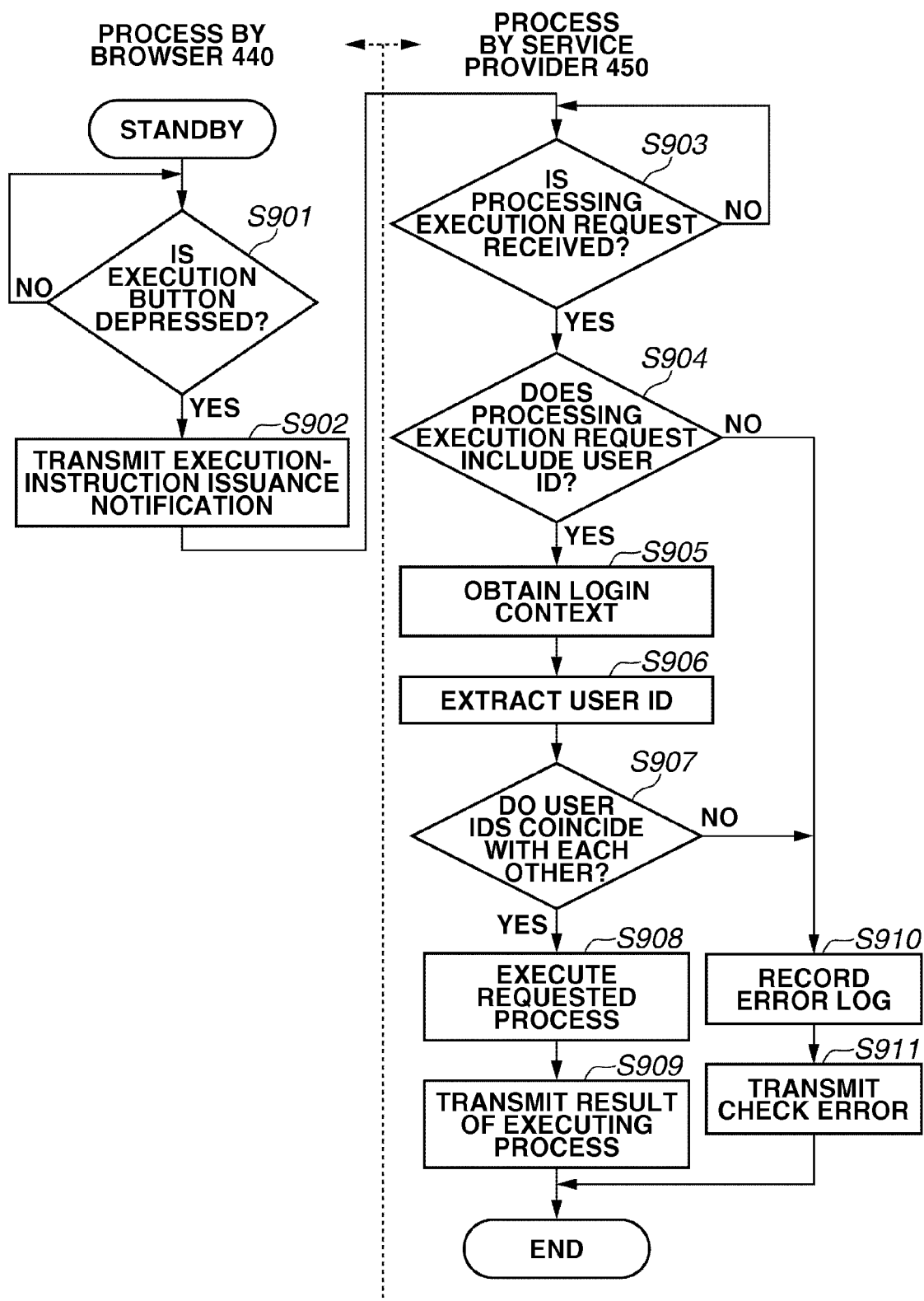
FIG. 9 is a flow chart describing the operations of the MFP according to the exemplary embodiment of the present invention.

FIG. 9 is a flow chart describing a series of operations executed by the MFP 101 after the execution instruction screen is displayed in step S512 in FIG. 5. Each operation illustrated in the flow chart in FIG. 9 is realized by the CPU 211 of the MFP 101 executing the control program. The steps S901 and S902 are processes executed by the web browser 440 and the steps S903 to S911 are processes executed by the service provider 450.

In step S901, the CPU 211 determines whether an execution button 701 of the execution instruction screen illustrated in FIG. 7 is depressed. If the execution button 701 is depressed (YES in step S901), the process proceeds to step S902 and the web browser 440 transmits to the web server 103 an execution-instruction issuance notification which represents that the execution instruction is issued from the user. At this point, various parameters (such as a file name and an image format) specified on the execution instruction screen illustrated in FIG. 7 are transmitted to the web server 103 along with the execution-instruction issuance notification. If the execution button is not depressed (NO in step S901), the process is on standby until the execution button is depressed.

In step S903, the CPU 211 determines whether a processing execution request is received from the web server 103. If the processing execution request is received (YES in step S903), the process proceeds to step S904. If the processing execution request is not received (NO in step S903), the process is on standby until the processing execution request is received.

In step S904, the CPU 211 determines whether the processing execution request received from the web server 103 includes a user ID. If the processing execution request includes the user ID (YES in step S904), the process proceeds to step S905. If the processing execution request does not include the user ID (NO in step S904), the process proceeds to step S910.

In step S905, the service provider 450 obtains the login context produced by the login application 430. In step S906, the user ID is extracted from the obtained login context.

In step S907, the CPU 211 checks the user ID included in the received processing execution request with the user ID extracted in step S906 to determine whether the user IDs coincide with each other. As a result of the check, if the user IDs coincide with each other (YES in step 907), the process proceeds to step S908. If the user IDs do not coincide with each other (NO in step 907), the process proceeds to step S910.

In step S908, the process is executed in accordance with the contents requested by the web server 103. More specifically, the scanner is controlled to execute the reading process and the image data produced by the reading process is transmitted according to the FTP protocol. In step 909 (transmit result of executing process), the web server 103 is notified of the result of executing the process and the process is ended. Thereafter, if an execution result display screen for notifying the user of the result of executing the process is transmitted from the web server 103, the web browser 440 displays the execution result display screen.

In step S904, if the CPU 211 determines that the user ID is not included (NO in step S904) or, in step S907, if the CPU 211 determines that the user IDs do not coincide with each other (NO in step 907), in step S910, error information indicating the occurrence of an error is recorded in the log recording unit 460. In step S911 (transmit check error), the web server 103 is notified of the occurrence of the error. If the user ID is not included or if the user IDs do not coincide with each other, as described above, the process is not executed, so that instructions from servers other than the web server 103 are not carried out.

Figure 10:
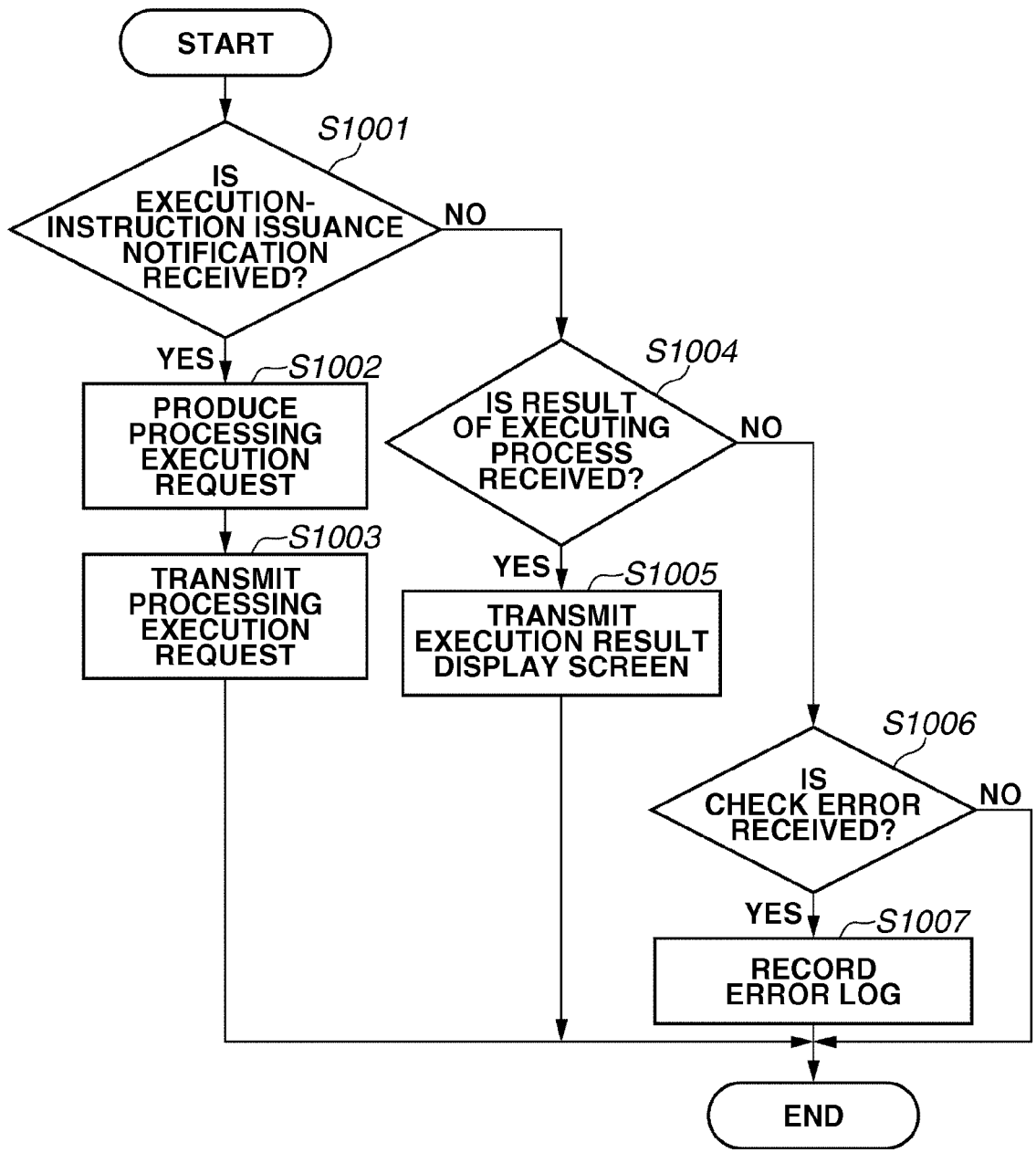
FIG. 10 is a flow chart describing the operations of the web server according to the exemplary embodiment of the present invention.

FIG. 10 is a flow chart describing a series of operations executed by the web server 103 when the MFP 101 executes the processes described in FIG. 9. Each operation illustrated in the flow chart in FIG. 10 is realized by the CPU 311 of the web server 103 executing the control program.

In step S1001, the CPU 311 determines whether the notification of execution-instruction issuance has been received from the MFP 101. If the notification of execution-instruction issuance has been received (YES in step S1001), the process proceeds to step S1002. If the notification of execution-instruction issuance has not been received (NO in step S1001), the process proceeds to step S1004.

In step S1002, the processing execution request to the MFP 101 is produced according to the contents of the instructions from the user included in the notification of execution-instruction issuance. The processing execution request includes the user ID received as the request to transmit execution instruction screen in step S801. In step S1003, the produced processing execution request is transmitted to the MFP 101.

In step S1004, the CPU 311 determines whether the result of executing the process has been received from the MFP 101. If the result of executing the process has been received (YES in step S1004), the process proceeds to step S1005. If the result of executing the process has not been received (NO in step S1004), the process proceeds to step S1006. In step S1005, the execution result display screen is transmitted to the MFP 101.

Figure 11:
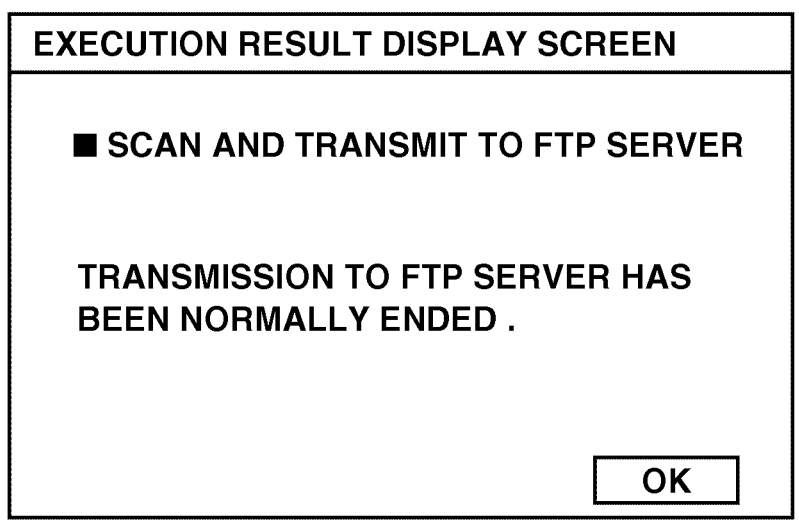
FIG. 11 is a diagram illustrating an operation screen displayed on the operation unit of the MFP according to the exemplary embodiment of the present invention.

FIG. 11 illustrates an example of the execution result display screen displayed by the web browser of the MFP 101. The execution result display screen displays information indicating the result of the process executed by the MFP 101.

In step S1006, the CPU 311 determines whether a check error has been received from the MFP 101. If the check error has been received (YES in step S1006), the process proceeds to step S1007. If the check error has not been received (NO in step S1006), the process is ended. In step S1007, error information indicating the occurrence of an error is recorded in the log recording unit 420.

As described above, in the first exemplary embodiment, the authentication information (user ID) used for the authentication process of the login application 430 is transmitted to the web server 103 to request the operation screen which is displayed on the web browser of the MFP 101. When the web server 103 receives a request for the operation screen from the MFP 101, the web server 103 determines whether the user ID has been received. If the web server 103 has received the user ID, the web server 103 determines that the MFP 101 has correctly performed the authentication process and transmits the requested operation screen to the MFP 101. On the other hand, if the web server 103 has not received the user ID, the web server 103 determines that the MFP 101 has not correctly performed the authentication process and does not transmit the requested operation screen to the MFP 101.

Thus, the user does not need to input the authentication information twice or more and the use of the web server 103 by a user who is not normally authenticated by the MFP 101 is limited.

Although in the present example, the user ID input on the authentication screen illustrated in FIG. 6 is transmitted as information indicating that the user is authenticated by the MFP 101, information other than the user ID may be transmitted as long as the information indicates that the user is normally authenticated by the MFP 101.

A second exemplary embodiment of the present invention is described below. In the second exemplary embodiment, the case is described where a configuration for determining whether the user ID is to be transmitted when the MFP 101 requests the operation screen from the web server 103 is added to each configuration described in the first exemplary embodiment.

Figure 12:
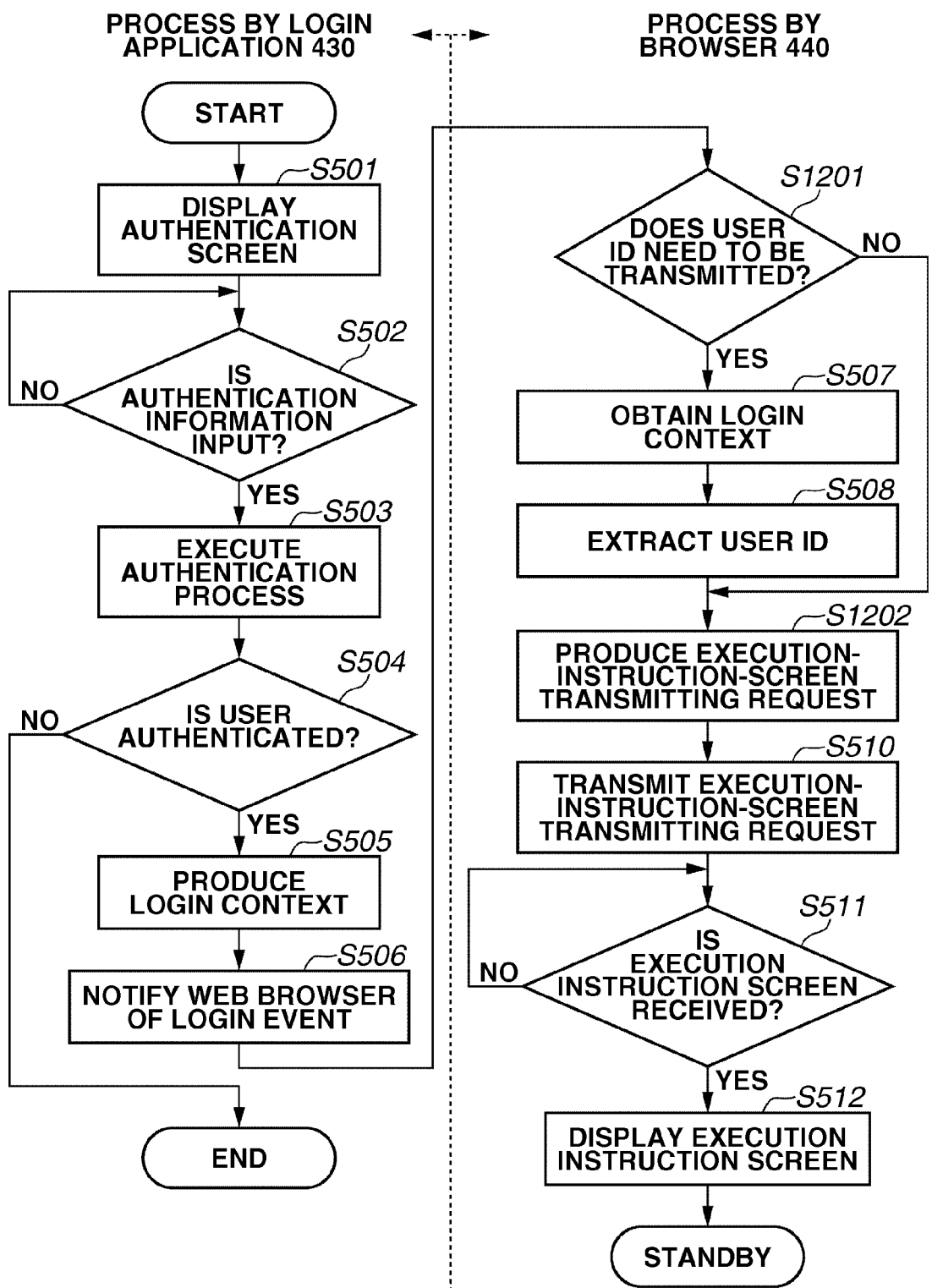
FIG. 12 is a flow chart describing the operations of the MFP according to the exemplary embodiment of the present invention.

FIG. 12 is a flow chart describing a series of operations in which the MFP 101 performs a user authenticating process and transmits the authentication information used for the authentication to the web server 103 to request the operation screen which is displayed on the web browser of the MFP 101. Each operation illustrated in the flow chart in FIG. 12 is realized by the CPU 211 of the MFP 101 executing a control program. In the steps S501 to S508 and S510 to S512, a process similar to the steps illustrated in the flow chart of FIG. 5 is performed, so that the description thereof is omitted herein.

In step S1201, the CPU 211 determines whether the user ID is to be transmitted when the web browser 440 requests the operation screen from the web server 103. In making the determination, a user ID transmission list illustrated in FIG. 13 is referred to.

FIG. 13 illustrates the user ID transmission list. The user ID transmission list manages information indicating a request destination to which the user ID is to be transmitted when the web browser 440 requests the operation screen. The user ID transmission list manages URL information.

In the determination of step S1201, the URL of a request destination (or, a communication partner which the web browser 440 accesses) from which the operation screen is requested is compared with the URL of the user ID transmission list. If the URLs coincide with each other, the CPU 211 determines that the user ID is to be transmitted when the web browser 440 requests the operation screen. On the other hand, if the URLs do not coincide with each other (i.e., if the web browser 440 makes a request to a request destination other than the request destinations corresponding to the URLs included in the list), the CPU 211 determines that the user ID is not to be transmitted.

As a result of determination in step S1201, if the CPU 211 determines that the user ID is to be transmitted (YES in step S1201), the process proceeds to step S1202 through steps S507 and S508. In this case, in step S1202, the process similar to that in step S509 in FIG. 5 is performed.

On the other hand, as a result of determination in step S1201, if the CPU 211 determines that the user ID is not to be transmitted (NO in step S1201), the process proceeds to step S1202 without passing through steps S507 and S508. In this case, in step S1202, the request to transmit execution instruction screen which does not include the user ID is produced.

The case where the user ID is not to be transmitted is described in more detail below.

For example, if the use of the web server is not limited to a specific user, the user ID is not to be transmitted. In other words, the web server which limits the use of itself to a specific user performs the processes described in FIG. 8 to permit the user to use itself if the user is authenticated by the MFP 101.

However, if the MFP 101 requests the operation screen from the web server which does not originally limit the use of itself to a specific user, the web server transmits the operation screen without determining whether the user ID is received. For this reason, in this case, the MFP 101 does not transmit the user ID. If the MFP 101 does not transmit the user ID, the web browser 440 of the MFP 101 can omit the processes for obtaining the login context and extracting the user ID from the login context.

As another example where the user ID does not to be transmitted, there may exist a case where the use of the web server is limited to a specific user and, therefore, a user is to be authenticated by an authentication process which is performed by the web server itself to use the web server.

In this case, even if the user is once authenticated by the MFP 101, the user is requested to input again authentication information to the authentication screen provided by the web server. The use of the web server is not permitted until the user is authenticated based on the authentication information input here. Therefore, even though the MFP 101 transmits the user ID, the authentication information is to be input again to the authentication screen which is transmitted from the web server. In this case, user's troublesome task of inputting the authentication information cannot be reduced, so that it is determined that the user ID is not to be transmitted in this case.

As described above, in the second exemplary embodiment, a determination is made as to whether the user ID is to be transmitted when the web browser 440 of the MFP 101 requests the operation screen from the web server 103. If it is determined that the user ID is not to be transmitted, the user ID is not transmitted to the web server 103. Thus, the process for transmitting the user ID can be omitted if the user ID is not to be transmitted.

A third exemplary embodiment of the present invention is described below. In the second exemplary embodiment, The example is described in which a determination is made as to whether the user ID is to be transmitted based on the request destination from which the operation screen is requested. If it is determined that the user ID does not need to be transmitted, the user ID is not transmitted. In the third exemplary embodiment, on the other hand, an example is described in which the user ID is not transmitted if a user logs in the MFP 101 without being authenticated by the login application 430.

Figure 14:
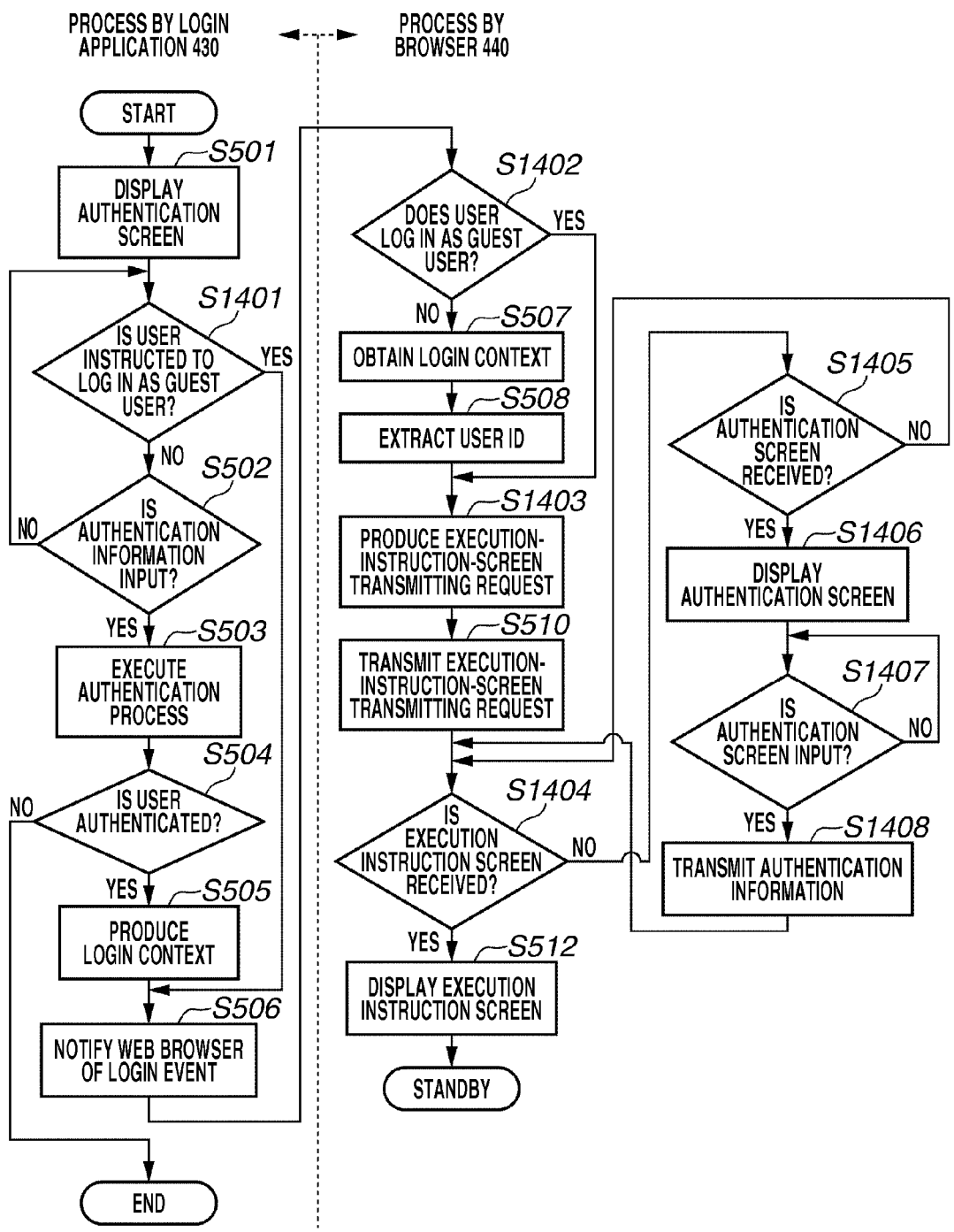
FIG. 14 is a flow chart describing the operations of the MFP according to the exemplary embodiment of the present invention.

FIG. 14 is a flow chart describing a series of operations in which the MFP 101 performs a user authenticating process and transmits the authentication information used for the authentication to the web server 103 to request the operation screen which is to be displayed on the web browser of the MFP 101. Each operation illustrated in the flow chart in FIG. 14 is realized by the CPU 211 of the MFP 101 executing a control program. The process in steps S501 to S508, S510, and S512 are similar to the steps illustrated in the flow chart of FIG. 5, so that the description thereof is omitted herein.

In step S1401, the CPU 211 determines whether a user is instructed to log in as a guest user. The term "guest user" is used in the case where a user is logged in to use the MFP when authentication information of the user is not previously registered in the authentication information holding unit 480. In this case, the guest user uses the MFP 101, which limits available functions compared with the registered user.

If the user is instructed to log in as the guest user (YES in step S1401), the process proceeds to step S506. If the user is not instructed to log in as the guest user (NO in step S1401), the process proceeds to step S502.

In step S1402, the CPU 211 determines whether the user logs in as the guest user. If the user logs in as the guest user (YES in step S1402), the process proceeds to step S1403. If the user does not login as the guest user (NO in step S1402) (in other words, if the user logs in through the authentication process in step S503), the process proceeds to step S507.

If the process proceeds to step S1403 through steps S507 and S508, in step S1403, the process similar to that in step S509 in FIG. 5 is performed.

If the process proceeds to step S1403 without passing through steps S507 and S508, in step S1403, a request to transmit execution instruction screen which does not include the user ID is produced.

In step S1404, the CPU 211 determines whether the execution instruction screen has been received from the web server 103. If the CPU 211 determines that the execution instruction screen has not been received (NO in step S1404), the process proceeds to step S1405.

In step S1405, the CPU 211 determines whether the authentication screen has been received from the web server 103. If the authentication screen has been received from the web server 103 (YES in step S1405), the process proceeds to step S1406. If the authentication screen has not been received from the web server 103 (NO in step S1405), the process returns to the determination process in step S1404.

In step S1406, the authentication screen is displayed based on the HTML file received from the web server 103. The authentication screen displayed herein is similar to that illustrated in FIG. 6, but is different from that illustrated in FIG. 6 in that the web browser 440 displays the authentication screen based on the HTML file provided by the web server.

In step S1407, the user determines whether the authentication information has been input through the authentication screen displayed in step S1406. If the authentication information has been input (YES in step S1407), the process proceeds to step S1408 to transmit the input authentication information to the web server 103. The process then returns to step S1404. If the authentication information has not been input (NO in step S1407), the process is on standby until the authentication information has been input.

The authentication information to be input to the authentication screen displayed in step S1406 refers to information used for the authentication process which is executed by the web application 410 in the web server 103. Therefore, the authentication information can be different from information to be input to the authentication screen (in FIG. 6) to which information used for the authentication process which is executed by the login application 430 is input.

Figure 15:
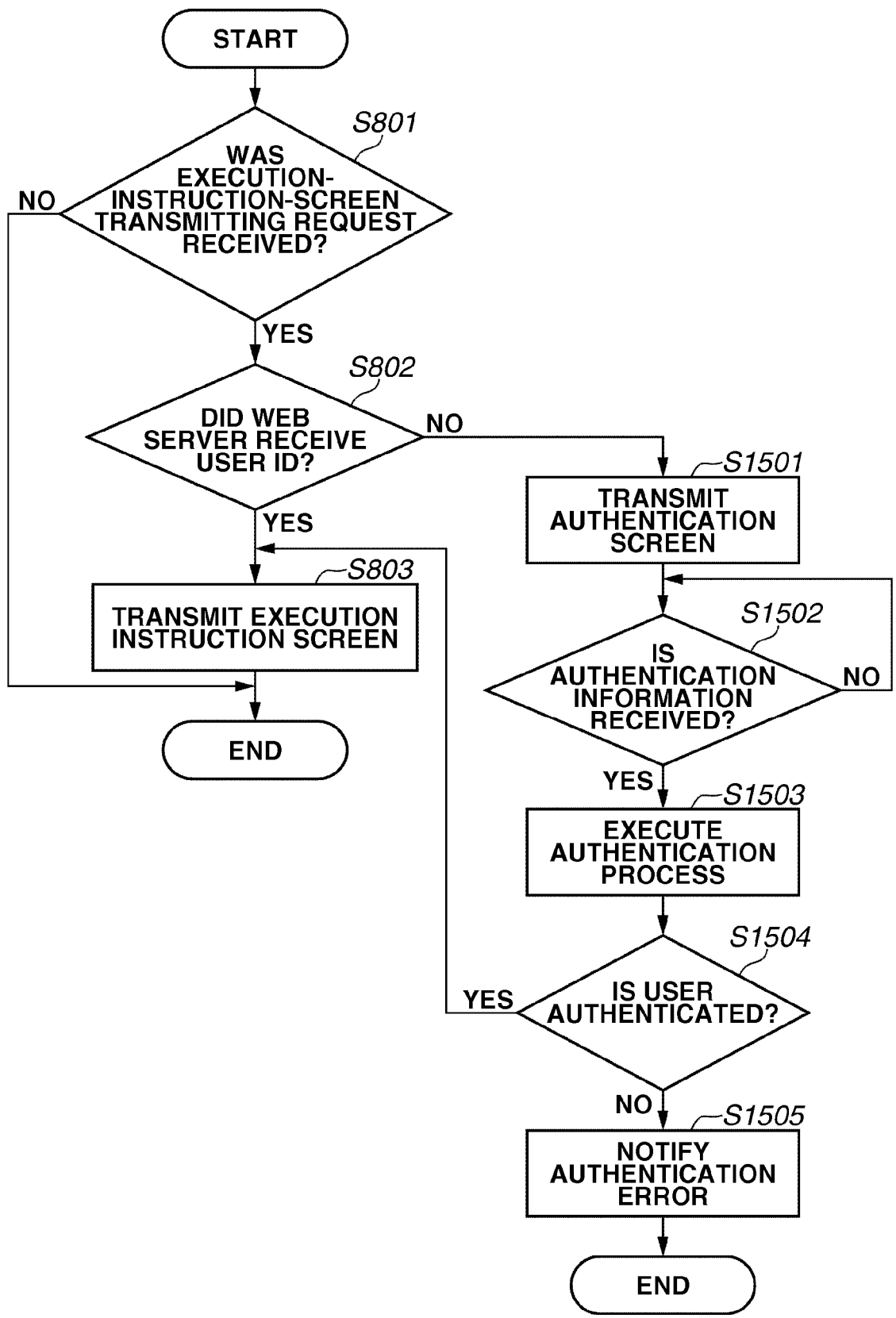
FIG. 15 is a flow chart describing the operations of the web server according to the exemplary embodiment of the present invention.

FIG. 15 is a flow chart describing a series of operations executed by the web server 103 when the MFP 101 executes the processes described in FIG. 14. Each operation illustrated in the flow chart in FIG. 15 is realized by the CPU 311 of the web server 103 executing the control program. The process in steps S801 to S803 are similar to the steps illustrated in the flowchart of FIG. 8, so that the description thereof is omitted herein.

In step S1501, the authentication screen to which the authentication information used for the authentication process which is executed by the web application 410 is input is transmitted to the MFP 101.

In step S1502, the CPU 311 determines whether the authentication information has been received from the MFP 101. If the authentication information has been received (YES in step S1502), the process proceeds to step S1503. If the authentication information has not been received (NO in step S1502), the process is on standby until the authentication information is received.

In step S1503, the authentication process for authenticating a user is executed using the received authentication information. In step S1504, the CPU 311 determines whether the authentication has been correctly performed. If the authentication has been correctly performed (or whether the user is authenticated) (YES in step S1504), the process proceeds to step S803. If the authentication has not been correctly performed (NO in step S1504), the process proceeds to step S1505.

In step S1505, the MFP 101 is notified of the occurrence of an authentication error. The occurrence of the authentication error may be recorded in the log recording unit 420.

As described above, in the third exemplary embodiment, whether to transmit the user ID is determined according to whether the user logs in through the authentication process by the login application 430 or the user logs in as a guest user. Thereby, even when authentication information of the user is not registered in the authentication information holding unit 480, the user can use the web application 410 if the user is authenticated by the web application 410.

In the foregoing first to the third exemplary embodiments, the example is described in which the external LDAP server 102 is used for the authentication process of the login application 430. However, the functions offered by the LDAP server 102 may be provided within the MFP 101.

In the foregoing first to the third exemplary embodiments, the example is described in which the web browser 440 transmits the request to transmit execution instruction screen which includes the user ID. However, the user ID may be transmitted in another method. For example, the login application 430 instead of the web browser 440 may transmit the user ID to the web application in the web server.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-286723 filed Nov. 7, 2008, which is hereby incorporated by reference herein in its entirety.

What is claimed is:

1. A system comprising: a web server; and an apparatus which communicates with the web server via a network and includes a web browser configured to display an operation screen provided by the web server;
wherein the apparatus includes:
an authentication unit configured to authenticate a user;
a first requesting unit configured to request the operation screen by transmitting information obtained as a result of the authentication by the authentication unit to the web server;
a processing unit configured to execute at least one of a print processing by a printer and a reading processing by a scanner according to a request from the web server, the request from the web server being based on an instruction input through the displayed operation screen; and
wherein the web server includes:
a determination unit configured to determine whether the information has been received when the operation screen is requested,
a transmission unit configured to transmit the operation screen to be displayed on the web browser to the apparatus when the determination unit determines that the information has been received from the apparatus, and
a second requesting unit configured to request, based on the instruction input through the displayed operation screen, the apparatus to execute at least one of the print processing by the printer and the reading processing by the scanner.

2. The system according to claim 1, wherein the information is a user ID.

3. The system according to claim 1, wherein the web server further includes a recording unit configured to record error information and,
if the determination unit determines that the information has not been received from the apparatus, the transmission unit does not transmit the operation screen and the recording unit records error information.

4. The system according to claim 1, wherein the apparatus further includes a judgment unit configured to judge whether the information is to be transmitted when the first requesting unit makes the request.

5. The system according to claim 4, wherein the first requesting unit makes the request by transmitting the information to the web server if the judgment unit judges that the information is to be transmitted, and the first requesting unit makes the request without transmitting the information to the web server if the judgment unit judges that the information is not to be transmitted.

6. The system according to claim 5, wherein the judgment unit makes the judgment based on a request destination.

7. The system according to claim 6, wherein the apparatus further includes a holding unit configured to store destination information indicating a request destination to which the first requesting unit transmits the information, and
wherein the judgment unit judges that the information is to be transmitted when the first requesting unit makes the request to a request destination indicated in the destination information stored in the holding unit, and the judgment unit judges that the information is not to be transmitted when the requesting unit makes the request to a request destination other than the request destinations indicated in the destination information stored in the holding unit.

8. The system according to claim 1, wherein the first requesting unit makes the request without transmitting the information if a user is not authenticated.

9. The system according to claim 8, wherein, if the determination unit determines that the information has not been received from the apparatus, the transmission unit transmits to the apparatus an authentication screen to which a user inputs authentication information used for an authentication process executed in the web server, instead of the requested operation screen.

10. An apparatus which communicates with a web server via a network and includes a web browser configured to display an operation screen provided by the web server, the apparatus comprising:
an authentication unit configured to authenticate a user;
a requesting unit configured to request the operation screen which is to be displayed on the web browser by transmitting information obtained as a result of the authentication by the authentication unit to the web server; and
a processing unit configured to execute at least one of a print processing by a printer and a reading processing by a scanner according to a request from the web server, the request from the web server being based on an instruction input through the displayed operation screen.

11. The apparatus according to claim 10, further comprising a judgment unit configured to judge whether the information is to be transmitted when the requesting unit makes the request,
wherein the requesting unit makes the request by transmitting the information to the web server if the judgment unit judges that the information is to be transmitted, and the requesting unit makes the request without transmitting the information to the web server if the judgment unit judges that the information is not to be transmitted.

12. The apparatus according to claim 11, wherein the judgment unit makes the judgment based on a request destination to which the requesting unit requests the operation screen.

13. The apparatus according to claim 12, further comprising a holding unit configured to store destination information indicating a request destination to which the requesting unit is to transmit the information.

14. The apparatus according to claim 13,
wherein the judgment unit judges that the information is to be transmitted when the requesting unit makes the request to a request destination indicated in the destination information stored in the holding unit, and the judgment unit judges that the information is not to be transmitted when the requesting unit makes the request to a request destination other than the request destinations indicated in the destination information stored in the holding unit.

15. A method in a system including a web server and an apparatus which communicates with the web server via a network and includes a web browser configured to display an operation screen provided by the web server, the method comprising:

authenticating a user;

requesting the operation screen to be displayed on the web browser by transmitting information obtained as a result of the authentication by the authenticating to the web server;

executing at least one of a print processing by a printer and a reading processing by a scanner according to a request from the web server, the request from the web server being based on an instruction input through the displayed operation screen;

determining whether the information has been received when the operation screen is requested from the apparatus;

transmitting the operation screen to the apparatus when it is determined that the information has been received from apparatus; and requesting, based on the instruction input through the displayed operation screen, the apparatus to execute at least one of the print processing by the printer and the reading processing by the scanner.

16. A method in an apparatus which communicates with a web server via a network and includes a web browser configured to display an operation screen provided by the web server, the method comprising:

authenticating a user; and requesting the operation screen which is to be displayed on the web browser by transmitting information obtained as a result of the authentication by the authenticating to the web server; and executing at least one of a print processing by a printer and a reading processing by a scanner according to a request from the web server, the request from the web server being based on an instruction input through the displayed operation screen.

17. A non-transitory computer readable storage medium storing a program for causing a computer to execute the method defined by claim 15.

18. A non-transitory computer readable storage medium storing a program for causing a computer to execute the method defined by claim 16.

* * * * *